United States Patent [19]
Kukoff

[11] Patent Number: 5,912,065
[45] Date of Patent: Jun. 15, 1999

[54] DECORATIVE ARTICLES AND METHOD OF MAKING SAME

[75] Inventor: Michael L. Kukoff, Short Hills, N.J.

[73] Assignee: Jay J. Kukoff, Springfield, N.J.; a part interest

[21] Appl. No.: 08/741,815

[22] Filed: Oct. 31, 1996

Related U.S. Application Data

[62] Division of application No. 08/268,965, Jul. 7, 1994, Pat. No. 5,597,434.

[51] Int. Cl.$^6$ ....................................................... B32B 9/00
[52] U.S. Cl. ........................ 428/195; 428/40.2; 428/41.1; 428/199; 428/200; 428/205; 428/210; 428/323; 156/230; 156/233; 156/234; 156/240
[58] Field of Search ..................................... 428/236, 240, 428/205, 323, 195, 41.1, 199, 40.2, 210, 200; 156/230, 234, 239, 233, 241, 240

[56] References Cited

U.S. PATENT DOCUMENTS

| | | | |
|---|---|---|---|
| 3,340,121 | 9/1967 | Lawrenz | 156/233 |
| 3,377,184 | 4/1968 | Kukoff . | |
| 3,971,692 | 7/1976 | Anderson | 156/241 |

*Primary Examiner*—William Krynski
*Assistant Examiner*—Abraham Bahta
*Attorney, Agent, or Firm*—Kirschstein, et al.

[57] ABSTRACT

A light-reflective decorative article is made by placing a foil sheet over a plurality of discrete, shaped particles of synthetic plastic material, thereupon fixing portions of the foil sheet on upper surfaces of the particles, and thereupon peeling the foil sheet off the particles but leaving behind the fixed foil sheet portions.

11 Claims, 3 Drawing Sheets

DECORATIVE ARTICLES AND METHOD OF MAKING SAME

CROSS REFERENCE TO RELATED APPLICATIONS

This application is a division of U.S. Ser. No. 08/268,965, filed Jul. 7, 1994, now U.S. Pat. No. 5,597,434.

BACKGROUND OF THE INVENTION

1. Field of the Invention

This invention generally relates to decorative articles having bead-like particles thereon and, more particularly, to making such articles with light-reflective characteristics.

2. Description of the Related Art

It is known from U.S. Pat. No. 3,377,184 to apply a tacky adhesive, preferably a polyvinylchloride plastisol, to a base fabric material in a desired pattern, and thereupon to apply or flock a plurality of bead-like pieces or particles of synthetic plastic material onto the tacky adhesive. The excess particles are then removed. The adhesive is cured by being heated. The plastic particles are thus fixedly set to the fabric material. The plastic particles actually melt slightly during the curing and fuse with the adhesive. The adhesive may be applied thicker or thinner depending on its proposed use; see, for example, U.S. Pat. No. 3,582,440.

It is also known from U.S. Pat. No. 3,806,397 to apply a multitude of light-reflective flakes (also known as "glitter") onto such an adhesive which has been applied to a release paper material. Each flake has an aluminum core which is coated over its entire periphery with a thin layer of a transparent polyvinylchloride. To cure the adhesive, heat is applied thereto and to the flakes on the adhesive. During this heating step, the transparent layer of polyvinylchloride that coats the flakes melts slightly and fuses with the adhesive. The flakes being essentially two-dimensional, planar and thin, e.g., on the order of 4 mils, lay flat against the release material.

Although generally satisfactory for their intended purpose, the known processes of making a light-reflective, decorative article requires a great quantity of coated light-reflective flakes to be manufactured and used. Also, since the transparent coatings melt to different extents during curing of the adhesive, the light-reflective characteristics, as well as the adhesion force, of the flakes vary. It is difficult to predict and/or control such variations, thereby leading to non-uniform production of the decorative articles.

SUMMARY OF THE INVENTION

Objects of the Invention

It is a general object of this invention to provide a novel method of making a light-reflective decorative article.

Another object of this invention is to decorate an article, such as a fabric, with light-reflective particles while avoiding the aforementioned difficulties and drawbacks of the prior art.

Still another object of this invention is to make a relatively lightweight material having a light-reflective characteristic that can readily be used in wearing apparel.

Yet another object of this invention is to make a light-reflective decorative article that can be folded, cut, rolled, sewn, draped, washed and cleaned with ease, without the light-reflective particles falling off the article during such procedures.

An additional object of this invention is to provide a light-reflective fabric from which the light-reflective particles will not flake off, especially when worn.

Another object of this invention is to provide a decorative article which simulates a stone-like, nail-head, studded, metal ornamented, bugle-beaded, raised appearance.

Features of the Invention

In keeping with these objects and others which will become apparent hereinafter, one feature of this invention resides, briefly stated, in a method of making a light-reflective decorative article, which comprises the steps of applying an adhesive on a base layer, adhering a plurality of discrete, shaped particles of synthetic plastic material to the base layer by contacting lower surfaces of the particles on the adhesive, and securing a light-reflective coating solely on upper surfaces of the particles above the base layer and out of contact with the adhesive.

The securing step is advantageously performed by placing a foil sheet, preferably a laminated foil sheet, over the particles, fixing portions of the foil sheet on the upper surfaces of the particles, and peeling the foil sheet off the particles but leaving behind the fixed foil sheet portions. The fixing step is performed by heating and pressing the foil sheet against the upper surfaces of the particles.

Thus, in accordance with this invention, it is no longer necessary to use a great quantity of light-reflective flakes having an aluminum core with a surrounding transparent coating. Instead, fewer and essentially three-dimensional plastic particles are used. There are no transparent coatings and, hence, no variation in the melting of such coatings, no variation in the light-reflective characteristics of the particles, and no variation in the adhesion force of the particles. The production of such decorative articles is more uniform than heretofore. The decorative articles have a richer, raised appearance. There are fewer particles and, hence, a decreased tendency for the particles to fall off during use or cleaning.

Still another feature of this invention resides in making an irremovable applique on a decorative article, comprising the steps of applying an adhesive on a release sheet, adhering a plurality of the plastic particles to the release sheet, removing the release sheet to form the applique, and permanently fixing the applique to a base layer.

An adhesive may be applied between the applique and the base layer. A light-reflective coating may be secured solely on upper surfaces of the particles above the release sheet and out of contact with the adhesive. As before, the securing step is performed by placing a foil sheet over the particles, fixing portions of the foil sheet on the upper surfaces of the particles, and peeling the foil sheet off the particles but leaving behind the fixed foil sheet portions. Advantageously, the fixing step is performed by heating and pressing the foil sheet against the upper surfaces of the particles.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 2:
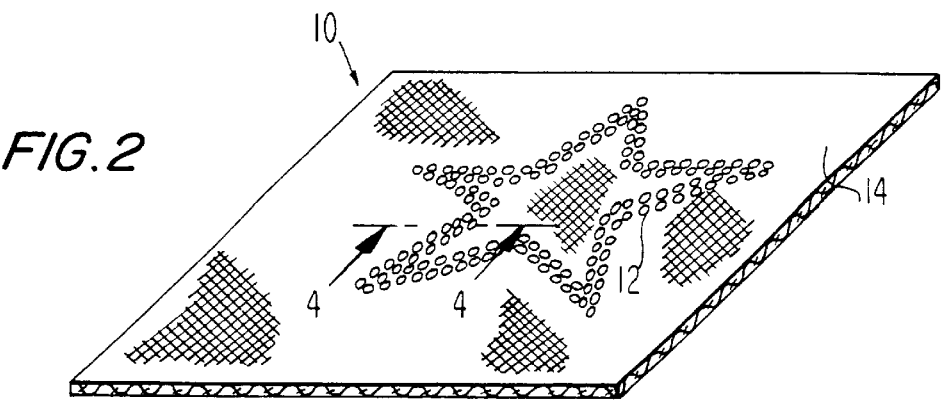
FIG. 2 is a perspective view of the article of FIG. 1 after manufacture.

Referring now to the drawings, reference numeral 10 in FIG. 2 shows a light-reflective decorative article manufactured in accordance with this invention. As described below, the article 10 is comprised of a plurality of discrete, shaped particles or beads 12 of synthetic plastic material. As shown, the particles are arranged in the shape of a five-pointed star. However, it will be readily understood by those skilled in this art that the arrangement of the particles may take any one of an infinite number of shapes or forms, and all such possibilities are intended to be covered by this invention.

The article 10 comprises a base layer 14. Advantageously, the base layer 14 is a fabric, either woven or non-woven, stretchable or non-stretchable, and preferably made from natural fibers, synthetic fibers, or combinations thereof. Preferably, the fabric is readily rolled, cut or sewn, so that it can be used for such applications as clothing, handbags, shoes, scarves, etc.

A layer of an adhesive 16 is applied over the base layer 14 in any desired pattern or design. Preferably, the adhesive is a curable plastisol which is applied in a liquid state to the base layer 14, either by hand or through a sieve, stencil, screen or analogous pattern-forming device to obtain the desired pattern. The wet adhesive penetrates slightly among the interstices of the base layer 14.

Basically, the plastisols are composed of vinyl chloride resin particles dispersed in a plasticizer to which may be added stabilizers, pigments, gelling agents, mineral spirits (for thinning) and similar modifying additives. The formulation of plastisols usable with the present invention is quite wide. For example, based upon 100 parts by weight of vinyl chloride resin, the amount of plasticizer may vary from 50 parts to 200 parts and the amount of pigment, stabilizers and/or other modifying components may vary between 0 and 10 parts.

Typical examples of plastisols which may be used with the present invention are as follows:

|  | Pounds |
|---|---|
| (1) | |
| Polyvinylchloride resin (QYNV) | 100 |
| Diisooctylphthalate | 80 |
| Dibutyl tin maleate | 1 |
| (2) | |
| Polyvinylchloride resin (Geon 121) | 100 |
| Dioctylphthalate | 80 |
| Barium-cadmium laurate | 1 |
| (3) | |
| Polyvinylchloride resin (Exon 654) | 100 |

-continued

|  | Pounds |
|---|---|
| Tri cresyl phosphate | 80 |
| Tri basic lead stearate | 2 |

Plastisols made according to the above formulations have the characteristics of pliability, flexibility and softness rather than the stiffness and hardness of other types of adhesives. They may be readily cut or sewn and then can withstand repeated washing or dry cleaning and have good, long-lasting wearing characteristics. If desired, these plastisols may contain pigmentation and may be thinned by mineral spirits. In this manner, the polyvinylchloride may be thinned to be free flowing for a flat appearance, or thickened so as to be viscous to give a high raised appearance where desired.

In the preferred embodiment, the plastisol is applied by being pressed through openings in a silk screen. The plastisol flows freely through the screen openings and will not clog them, thereby assuring that the screen can be re-used. The openings may have extremely fine detail and, hence, the adhesive pattern can be likewise very detailed.

Figure 3A:
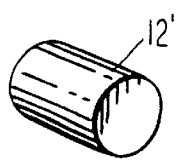
FIGS. 3A, 3B and 3C are perspective views of differently shaped particles for use in the manufacture of the article of FIG. 2.
Figure 3B:
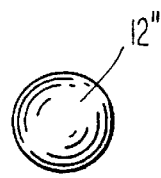
Figure 3C:
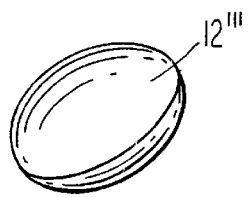

Next, the plastic particles 12 are applied to the wet adhesive before the adhesive has dried or is cured. The particles 12 are preferably made from lengths of extruded plastic which are cut into the desired shape and size. The plastic particles may be solid, hollow, flat, or of any other desired configuration. See, for example, FIGS. 3A, 3B and 3C which show representative cylindrical, spherical and football-shaped particles 12', 12" and 12''', respectively. The plastic particles are three-dimensional and, in a preferred embodiment, each measures about 50 mils along each dimension.

In the preferred embodiment, the particles are made of a plastic from the polyvinyl group, preferably polyvinylchloride. Such particles are readily held by the plastisol adhesive. Additional suitable plastics may be selected for the particles from those plastic compounds having polymers obtained from polymerization of unsaturated compounds. The plastic particles are relatively soft so that they can be cut or sewn through. They are also durable enough to maintain their shape throughout their life and can be dry cleaned or washed at normal temperatures. The plastic particles are relatively light so that a large number may be placed on a piece of the base layer 14 without unduly weighing it down. Any combination of colors, shapes and/or sizes of plastic particles may be utilized on a single piece of base layer as desired. The plastic particles cover up the plastisol to a large extent so that the plastisol does not show through. All of these features make the finished decorative article suitable for a wide variety of uses.

The particles are flocked onto the adhesive-coated pattern on the base layer by hand or by using a suitable sieve. The plastic particles stick to the wet, tacky, adhesive-coated portions, and a pattern of plastic particles corresponding to the pattern of the adhesive is laid down on the base layer.

Figure 1:
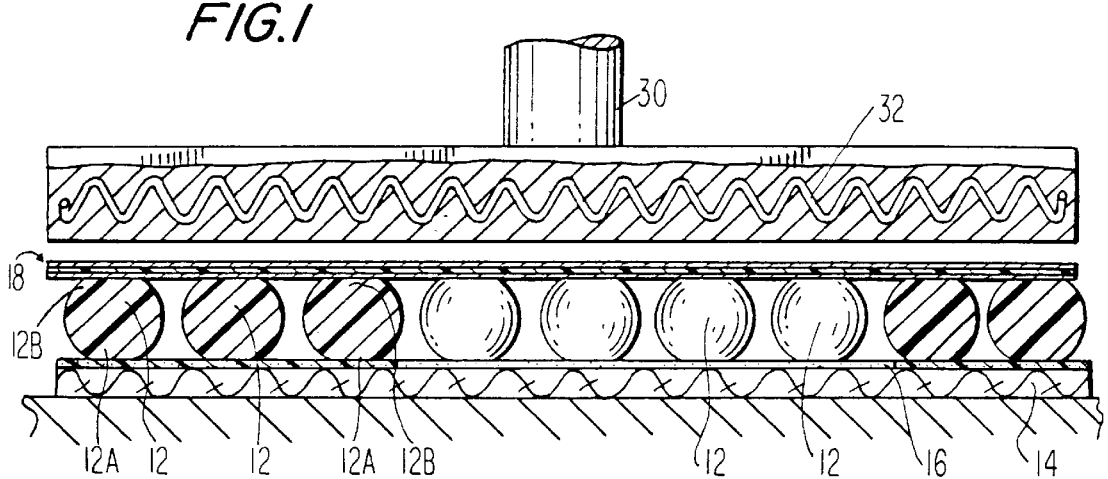
FIG. 1 is an enlarged sectional view of a light-reflective decorative article in accordance with this invention at one stage of its manufacture.

After the plastic particles are applied to the base layer, the excess particles which did not initially adhere to the base layer are removed, for example, by shaking the base layer or by using air or gas to blow off the excess particles. Preferably, a vacuum cleaner or analogous suction device picks up the excess particles. As shown in FIG. 1, only the excess particles are removed, and the remaining particles have lower portions 12A which are in contact with the plastisol 16 and which are adhered to the base layer 14.

In order to firmly fix the portions 12A of the plastic particles 12 to the base layer, the plastisol is heated to its curing point, i.e., the temperature at which the polyvinylchloride particles in the plastisol solidify. This is accomplished by placing the base layer on a heated plate, or by placing it in an oven, or by using infrared heating lamps, or by using any other suitable heating means. All of the plastisols described above have a heat curing temperature in the range of between 300° F. to about 400° F., and all will adhere firmly to a fabric or other porous material. It is preferred that a plastisol which cures at 300° F. and above be used so that the finished garment will withstand the highest temperatures usually encountered in a commercial dry cleaning process.

In accordance with this invention, a light-reflective coating is secured solely over and on upper surfaces 12B of the particles. A foil sheet 18 is placed over and on the upper surfaces 12B. The foil sheet 18 is preferably a laminated sheet and has an outer layer 20 constituted of a light-reflective material, e.g., a metal; a carrier layer 22 constituted of a plastic material, e.g., polyester mylar; and an inner layer 24 constituted of a heat-sensitive adhesive curable at temperatures at least equal to 300° F. A foil sheet suitable for this purpose is manufactured by Crown Roll Leaf, Inc., of Paterson, N.J. and marketed as Model No. "MK44." The inner adhesive layer 24 is preferably applied to the sheet at the time of the sheet manufacture, rather than being applied during the making of the article.

As shown in FIG. 1, the foil sheet 18 is pressed by a drive, e.g., a piston 30, against the upper surfaces 12B of the particles. At the same time, the foil sheet 18 is heated by a heater, e.g., a resistive element 32 mounted within the piston 30. The heater is operative to generate temperatures on the order of 300° F. to cure the adhesive layer 24. The drive is pressed against the particles with a force on the order of 150 psi for about 5 seconds.

Figure 4:
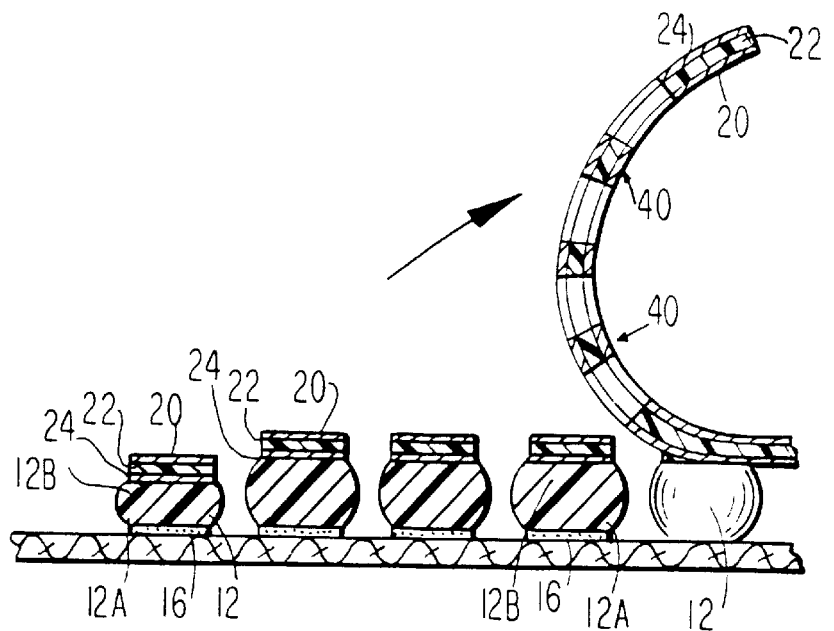
FIG. 4 is an enlarged sectional view taken on line 4—4 of FIG. 2 showing the peeling of a foil sheet from the particles at a stage of manufacture subsequent to that shown in FIG. 1.

Those portions of the foil sheet which are pressed against the upper surfaces 12B are fixed thereto. Thereupon, the foil sheet 18, as shown in FIG. 4, is pulled off the particles. Those fixed portions of the sheet remain on the upper surfaces 12B. All the other portions of the sheet, labelled by reference numeral 40 in FIG. 4, are removed during the peeling step. The sheet 18 is sufficiently thin, on the order of a few mils, and flexible to be pressed against particles 14 of different sizes and elevations relative to the base layer. The finished article is thus provided with a light-reflective coating which is provided only on the upper surfaces 12B and which does not, as taught in the prior art, completely encircle the particles. Also, the finished article has a raised appearance which simulates the appearance of more expensive, metal-ornamented fabrics.

Figure 5:
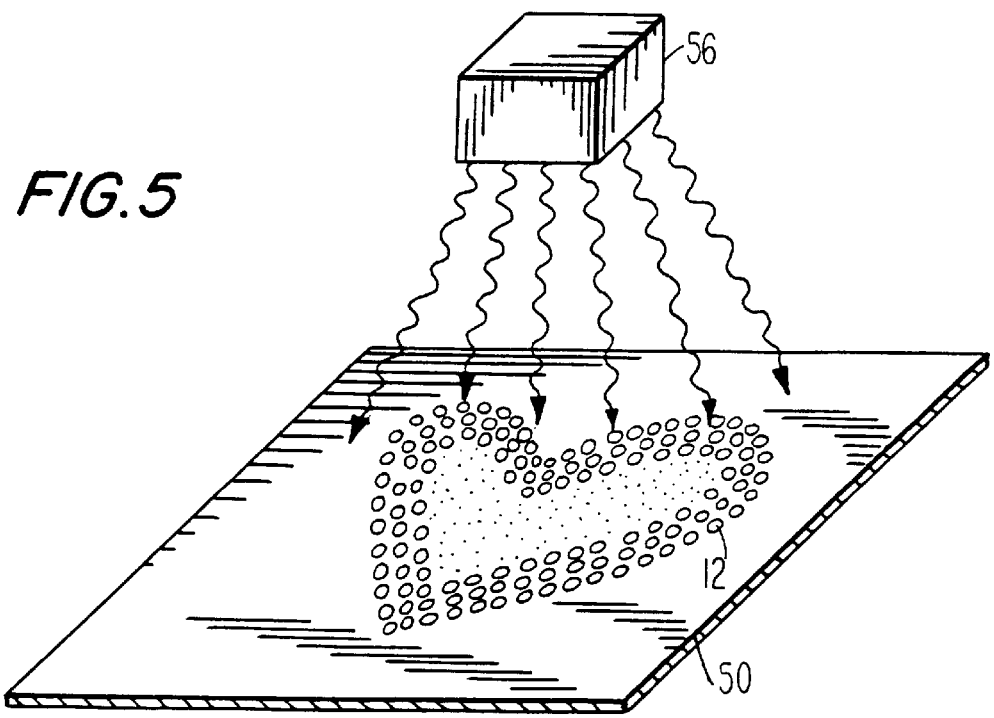
FIG. 5 is a perspective view of another embodiment of a decorative article in accordance with this invention at one stage of its manufacture.
Figure 6:
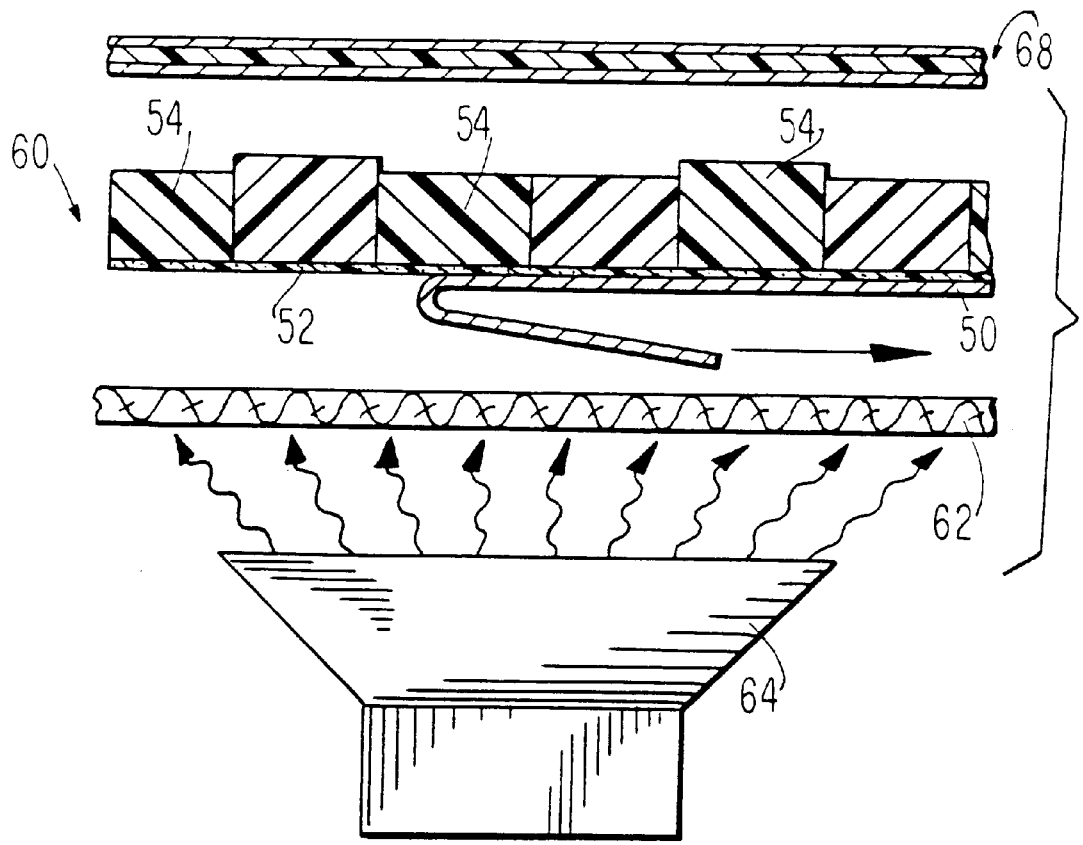
FIG. 6 is an enlarged sectional view of the article of FIG. 5 during a subsequent stage of its manufacture.
Figure 7:
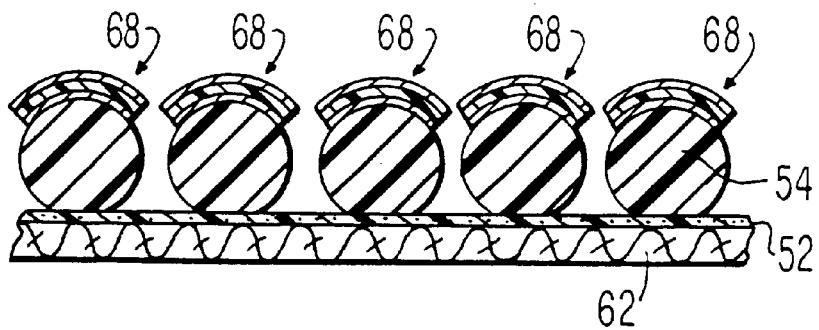
FIG. 7 is an enlarged sectional view of the article of FIG. 5 after manufacture.

Turning now to FIGS. 5 through 7, the base layer 14 need not be a fabric material as described above, but could instead be a release layer 50 such as paper, either uncoated or coated with a release coating. As before, a plastisol 52 is applied in a pattern on the release layer 50, and a plurality of discrete particles 54 of synthetic plastic material and of different sizes and shapes is flocked on the plastisol 52. A heater 56 (see FIG. 5) cures the plastisol 52 and fixes the lower surfaces of the particles 54 securely in place in the plastisol 52.

Thereupon, as shown in FIG. 6, the release layer 50 can be removed by peeling from the underside of the plastisol 52, thereby forming an applique 60. The applique can be used as is, or, a foil sheet 68, analogous to the aforementioned foil sheet 18, is applied over and secured to the particles 54 in a manner completely analogous to that described above. Peeling the foil sheet 68 from the particles 54 will result in a light-reflective coating on the upper surfaces of the particles. The light-reflective applique can be used as a decoration by itself, e.g., as a Christmas ornament or the like.

Alternatively, the applique 60, with or without the application of the foil sheet 68, may be applied either directly to a base layer 62, e.g., a fabric material, or the plastisol 52 is applied between the applique 60 and the base layer 62. In either event, a heater 64 is used to permanently affix the applique 60 to the base layer 62. The resulting decorative article is shown in FIG. 7.

It will be understood that each of the elements described above, or two or more together, also may find a useful application in other types of constructions differing from the types described above.

While the invention has been illustrated and described as embodied in decorative articles and a method of making same, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalents of the following claims.

What is claimed as new and desired to be protected by Letters Patent is set forth in the appended claims:

I claim:

1. A decorative, flexible article having a raised, light-reflective pattern thereon, comprising:
    a) a flexible base material;
    b) a curable plastisol adhesive applied in the pattern on the base material;
    c) a plurality of discrete, shaped particles of synthetic plastic material each having a longitudinal dimension on the order of 50 mils, each particle having lower surfaces in direct contact with the plastisol adhesive prior to curing, and upper surfaces facing away from the plastisol adhesive; and
    d) laminated foil sheet portions on the upper surfaces of the particles, each laminated sheet portion having a heat-sensitive, settable adhesive layer in direct contact with the upper surfaces of the particles, a carrier layer, and a light-reflecting layer facing away from the particles, said carrier layer being located between the adhesive layer and the light-reflecting layer.

2. The article according to claim 1, wherein the flexible base material is a fabric.

3. The article according to claim 1, wherein the adhesive is a polyvinylchloride plastisol.

4. The article according to claim 1, wherein the plastic material of the particles is polyvinylchloride.

5. The article according to claim 1, wherein the particles are of different shapes.

6. The article according to claim 5, wherein the particles are constituted of extruded pieces of the plastic material.

7. The article according to claim 1, wherein the light-reflecting layer is constituted of a metallic material.

8. The article according to claim 1, wherein the carrier layer is constituted of a plastic material.

9. The article according to claim 8, wherein the carrier layer is a polyester mylar.

10. The article according to claim 1, wherein the heat-sensitive, settable adhesive layer cures at temperatures at least equal to 300° F.

11. The article according to claim 1, wherein the flexible base material is a release layer.

* * * * *